April 10, 1962 D. LABINO 3,028,623
APPARATUS FOR PRODUCING A LOW DENSITY MAT OF GLASS FIBERS
Filed June 6, 1958 4 Sheets-Sheet 1

INVENTOR.
Dominick Labino
BY
Nobbe & Swope
ATTORNEYS

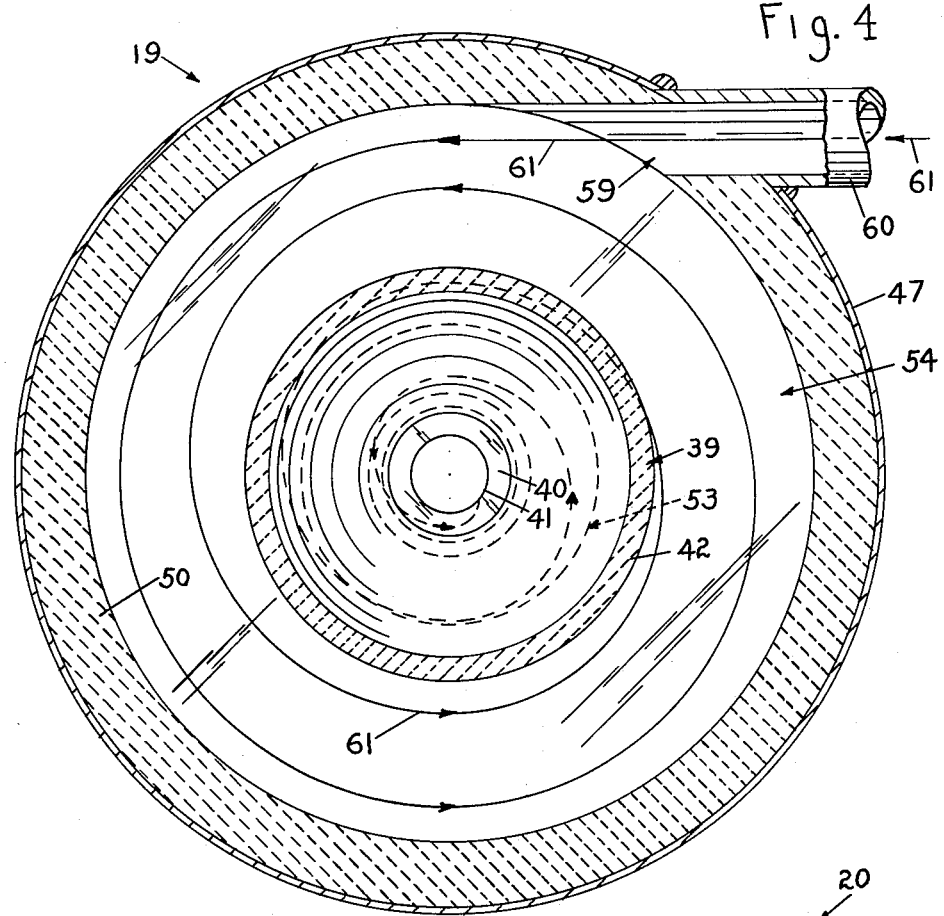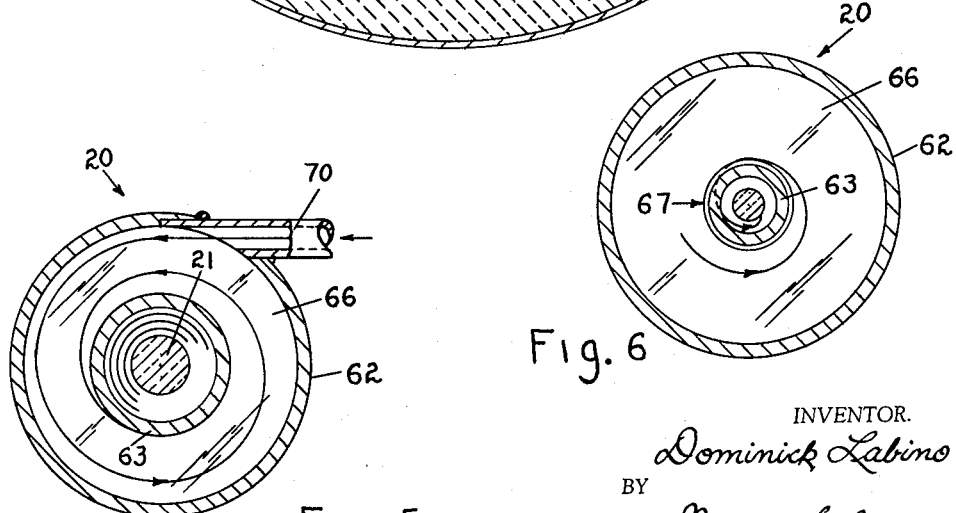

April 10, 1962     D. LABINO     3,028,623
APPARATUS FOR PRODUCING A LOW DENSITY MAT OF GLASS FIBERS
Filed June 6, 1958     4 Sheets-Sheet 4

INVENTOR.
Dominick Labino
BY
Hobbe & Swope
ATTORNEYS ately it relates to apparatus for making fine curly glass fibers and directing the fibers at low velocity onto a translatory collection surface to produce a low density mat.

United States Patent Office 3,028,623
Patented Apr. 10, 1962

3,028,623
APPARATUS FOR PRODUCING A LOW DENSITY MAT OF GLASS FIBERS
Dominick Labino, Grand Rapids, Ohio, assignor, by mesne assignments, to Johns-Manville Fiber Glass Inc., Cleveland, Ohio, a corporation of Delaware
Filed June 6, 1958, Ser. No. 740,387
3 Claims. (Cl. 18—2.5)

This invention relates broadly to apparatus for producing a low density mat of glass fibers. More specifically it relates to apparatus for making fine curly glass fibers and directing the fibers at low velocity onto a translatory collection surface to produce a low density mat.

Fine glass fibers of the so-called staple or wool type find wide application. For example, they are employed in the form of mats and batts for thermal and acoustical insulation purposes, such as for domestic and commercial buildings, for vehicles such as automobiles and aircraft, and for household appliances such as stoves and clothes driers to mention only a few.

The apparatus disclosed herein is particularly useful in producing glass fiber mats of low density to provide a superior material for the above-mentioned application and a superior medium for the fine filtration of fluids, including air, other gases and liquids. The character of the mat, due to the fineness and curly nature of the fibers combined with the low density, provides a multitude of minute serpentine passages extending from surface to surface of the mat, which passages offer very little resistance to the passage of the fluid but due to their small size and sinuous nature retain fine particles of any foreign matter that may be entrained in the fluid.

So-called staple fibers have heretofore been produced by two principal methods, one of which includes the "wool" process and the more recently developed burner process. Each of the processes mentioned, while accounting for the production of large annual tonnages of glass fibers, nevertheless suffers an economic disadvantage of requiring large amounts of energy per pound of fiber produced. For example, the wool process requires either steam under pressure or compressed air; and requires these materials in large volume, to attenuate individual, small streams of glass into fibers. The burner process is still more inefficient from an energy input standpoint in that glass is melted and allowed to cool as it is formed into primary filaments. The primary filaments are then remelted and attenuated to fine fibers. Thus all of the heat initially utilized in manufacturing the glass from the batch materials is lost.

The apparatus disclosed herein channels the combustion gases that are normally a residual waste product of the glass melting apparatus into substantially enveloping coaxial relation to the stream or streams of molten glass issuing from the melting furnace and these gases retain that enveloping relationship to each stream of molten glass as it progresses into the fiberizing zone. Since the temperature of the residual gases is in excess of the glass temperature by as much as 600° F., the gases enveloping each stream of glass further reduce the viscosity of the glass and also form an insulating barrier between the glass and the atmosphere to prevent chilling prior to attenuation thereby reducing the amount of energy required to attenuate each stream of glass into a plurality of fine diameter fibers.

It is therefore an important object of this invention to provide a more efficient apparatus for producing fine glass fibers.

It is another object to provide apparatus for producing glass fibers wherein a gaseous blast is utilized to attenuate a single molten stream of glass into a plurality of fine curly fibers.

Another object is to provide apparatus for producing glass fibers of the curly wool type wherein a blast of gas of cyclonic configuration is utilized to attenuate a single molten stream of glass into a plurality of fibers.

It is still another object of this invention to provide a novel apparatus for producing fine curly glass fibers and collecting them into a low density mat.

It is a further object of this invention to provide a novel apparatus for utilizing the exhaust gases from a glass melting furnace to thermally insulate a stream of glass issuing from the furnace for fiberization.

Another object is to provide an apparatus for producing glass fibers wherein a molten stream of glass is subjected to a fiberizing gaseous blast of cyclonic configuration and wherein the molten stream of glass prior to and during contact with the fiberizing blast is surrounded by an insulating layer of hot gas.

Other objects and advantages of the invention will become more apparent during the course of the following description when taken in connection with the accompanying drawings.

In the drawings wherein like numerals are employed to designate like parts throughout the same:

FIG. 4 is a cross-section of the glass melting furnace of FIG. 3 taken on the line 4—4;

FIG. 5 is a cross-section of the cyclonic blast generator of FIG. 3 taken on the line 5—5;

FIG. 6 is another cross-sectional view of the cyclonic blast generator of FIG. 3 taken on the line 6—6;

Figure 1:
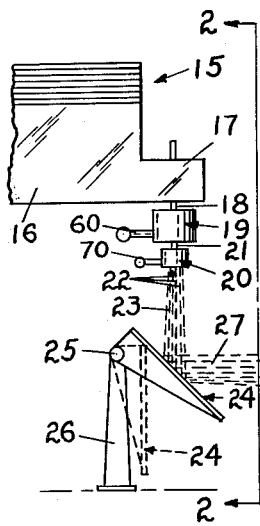
FIG. 1 is a schematic side elevation of apparatus utilizing the cyclonic blast principle to form glass fiber mats.
Figure 2:
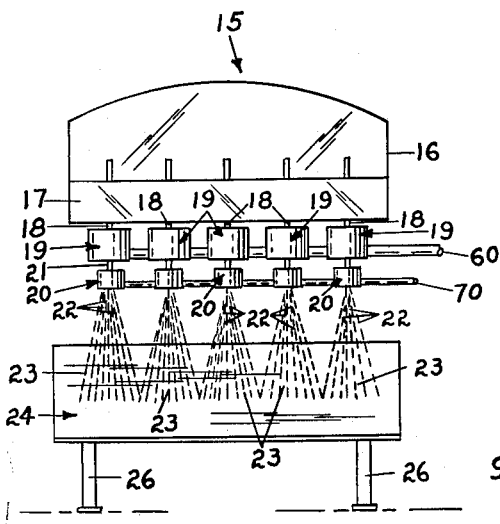
FIG. 2 is a sectional elevation taken on the line 2—2 of FIG. 1.

As shown in FIGS. 1 and 2, apparatus adapted to a high volume production of low density glass fiber mats of the character disclosed, utilizing the cyclonic blast principle for making the fibers includes a central glass melting tank 15. The tank 15 is a typical elongated, shallow structure and includes a batch charging section (not shown), a refining section 16 and a draw section 17, remote from the charging section, from which molten glass is drawn in individual streams 18 of relatively large diameter.

A combustion chamber 19 and a cyclonic blast generator 20, both of cylindrical configuration, are spaced in descending order below the glass melting tank 15 and in concentric relation with the axis of each stream of molten glass 18. The construction of the combustion chamber and the cyclonic blast generator will be described in detail hereinafter.

Each stream of glass 18 is enveloped by the gaseous combustion products issuing from its associated combustion chamber 19 thus forming a coaxial stream 21 with the glass stream 18 as the central core. Each coaxial stream 21 is progressively advanced into the eye of the cyclonic blast issuing from the bottom of each generator 20 thereby converting the stream of glass into a plurality of fine curly fibers 22 descending in a conical configuration 23.

A plane 24 of metal, or any other suitable material, is pivotally mounted as at 25 on one or more supports 26 and in the operational position, shown in solid lines, is inclined at an angle to intercept the conical array of fibers 22 produced by the cyclonic blast generator 20 and to deflect the movement of the fibers into a substantially horizontal flight 27 at a retarded velocity.

When initiating operation of the mat making apparatus the fibers may not be properly formed and during the period of adjustment the plane 24 is rotated about the pivot to the dashed line position of FIG. 1 which permits collecting the improperly formed fibers into a waste collection receptacle.

In the course of the horizontal flight 27 of the fibers 22 the motivating force is dissipated and the fibers are gently deposited upon the collection flight 28 of an endless conveyor chain 29. The collection flight 28 is inclined to move in the direction of the horizontal flight 27 of the fibers to further mitigate the force with which the fibers are deposited on the chain and contributes to accumulating the fibers in a low density mat. The chain 29 is supported by a plurality of rollers 30, one of which is rotated in a clockwise direction to advance the chain 29 in that direction.

To further promote the accumulation of the fibers 22 in a low density mat 31, a suction box 32 is positioned on the underside of the chain 29 on the second flight 33 of the chain. The chain 29 is an open, foraminous structure of sufficiently fine mesh that it will collect the fibers 22, while permitting the passage of air and gases. In the prior art it has been the practice to apply a suction at the collection point, however it has been found that a mat of lower density can be secured by exerting these forces in series instead of simultaneously, particularly when the magnitude of the suction is restricted to merely retain the fibers on the chain in the jackstraw pattern of airborne deposition.

A thermosetting binder material 34, such as an aqueous phenolic resin, may be distributed over the surface of the fibers 22, preferably as they are deposited on the chain 29. The resin used is generally a thermosetting type and is effective upon being cured to bind the fibers together at their points of contact to provide a mat of highly resilient configuration.

The mat 31 is transferred to a second conveyor 36 for transportation through an oven 37 where the binder material 34 is cured to fix the relative position of the fibers making up the mat. Thereafter the mat is packaged as illustrated by the roll 38.

In contrast to the mats produced by present commercial apparatus the mat forming the subject matter of this invention is characterized by a uniformity heretofore unattainable. This has been accomplished by providing a single glass melting tank to assure a uniform composition of the molten glass streams subjected to the attenuating forces and by the reduction in the temperature differential between individual streams of glass at the attenuation point.

It will be obvious that different arrangements and combinations may be made, utilizing one or more of the fiber forming units 19 and 20. For example, a series of 10 or 12 fiber forming units may be positioned in horizontal alignment across the width of a belt to provide mats of 72 inches or other desired width. Depending upon the speed of travel of the belt and the output of fibers, mats of any thickness can be produced.

Figure 3:
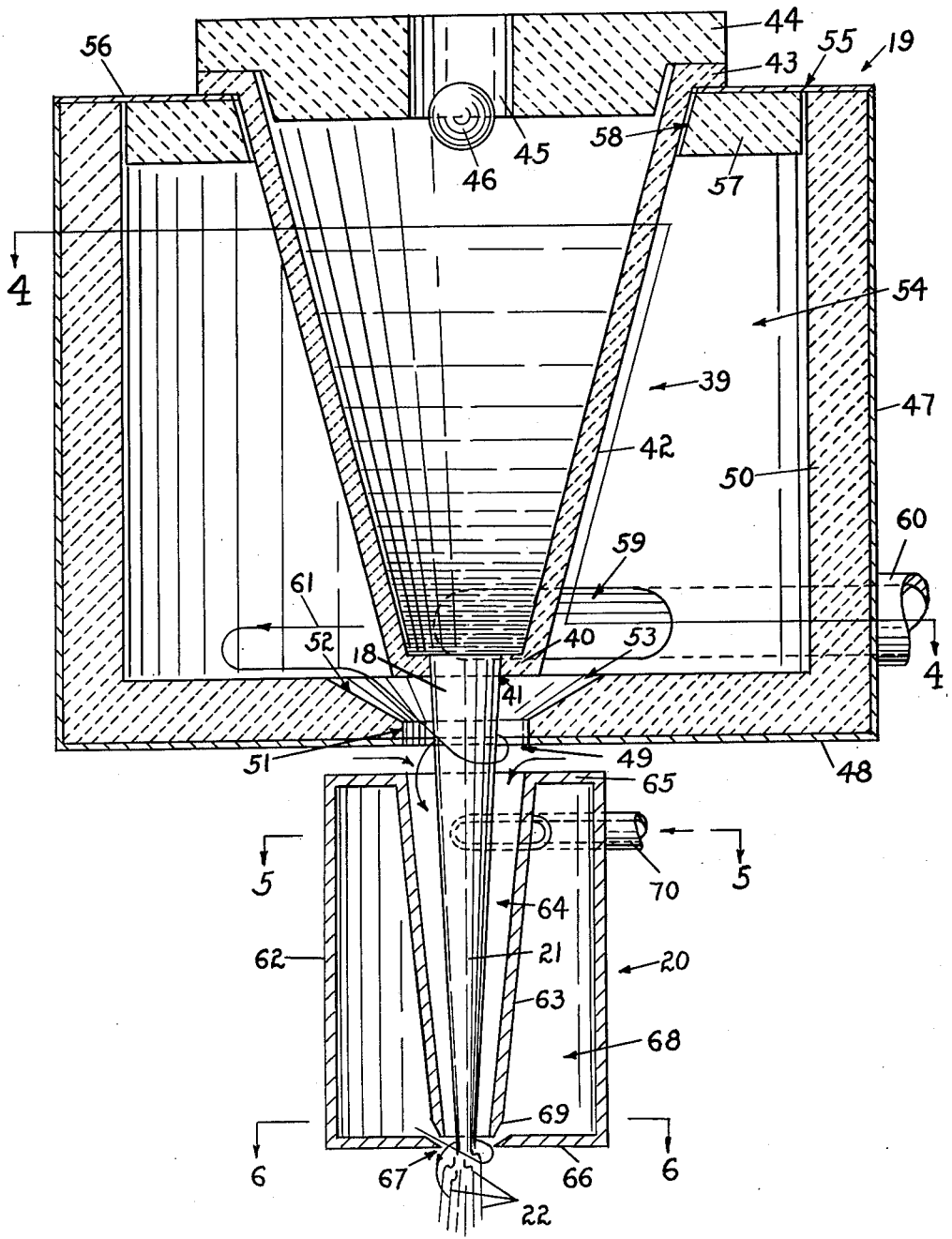
FIG. 3 is an elevation in section taken on the vertical centerline showing a second form of glass melting furnace in combination with a glass fiberizing cyclonic blast generator.

The invention in a second form, wherein each stream of glass 18 originates from an individual glass melting bushing 39 positioned within a combustion chamber 19, is illustrated in FIGS. 3 and 4.

This second form includes a bushing or crucible 39 having a bottom wall 40 with a central circular aperture 41 forming a discharge for the stream of molten glass 18. An inverted conical wall 42 rises from the bottom wall 40 diverging outwardly to terminate in an annular flange 43. A cover 44 for closing the top of the bushing is provided with a central opening 45 for the feeding of glass, which may be in the form of marbles 46, into the interior of the bushing. Both the bushing 39 and the cover 44 are preferably made of a high temperature and erosion resisting refractory material. Refractory materials such as refractory clay, sillimanite, mullite, or other high-alumina refractory can be employed. A primary requirement of the material of which the melting chamber is made is that it have a very low coefficient of expansion. This will prevent strains and fractures from being developed in the melting chamber during operation. The melting chamber is suitably made by a slip casting process typical of that used for making pottery vases, employing a split mold. However, they may be made of a metal such as platinum or of a platinum-rhodium alloy.

The diameter of the aperture 41 determines the diameter of the stream of glass issuing from the bushing 39. The combustion chamber 19 encloses substantially all of the bushing 39 with only the flange 43 and the cover 44 protruding from the top for a purpose which will become apparent. The combustion chamber comprises a cylindrical metal shell 47, concentric with the vertical axis of the bushing 39, closed by a circular metal base 48. An opening 49 penetrates the base in axial alignment with the aperture 41 in the bushing 39. The inner faces of the shell 47 and the base 48 are lined with a high temperature resisting refractory material 50 provided with a perforation 51 formed as a continuation of the opening 49 in the metal base 48. The perforation 51 flares upwardly and outwardly in a conical configuration 52 terminating at a level substantially in a horizontal plane with the lower face of the bottom wall 40 of the bushing 39 with the major circumference of the cone in concentric circumscribing relation to the bottom wall 40 of the bushing 39. The concentric openings 49, 51 and 52 are in vertical alignment with the bushing discharge aperture 41 and together these openings form a discharge port 53 for the stream 18 of molten glass and the gaseous products of combustion formed within the cavity 54. The stream of molten glass 18 and the combustion product gases form the aforementioned coaxial stream 21 in a manner to be described in detail hereinafter.

A circular cover 55 comprised of an annular metal plate 56 of the same outside diameter as the shell 47 and an annular liner 57 of a high temperature refractory material is provided with a central opening 58 sufficiently large to receive the body of the bushing 39 and small enough so that the lower face of the bushing flange 43 rests upon the top surface of the cover plate 56 to position the bushing 39 in the aforementioned axial relationship to the discharge port 53 of the combustion chamber 19. The outside diameter of the refractory cover liner 57 is reduced to telescope within the shell liner 50.

A fuel inlet port 59 penetrates the refractory liner 50 and the shell 47 to enter in tangential relation to the inner diameter of the liner 50 and is aligned with a fuel inlet conduit 60 which is in communication with a pressurized source of a gaseous fuel mixture (not shown). As illustrated by the directional flow line 61 the fuel mixture enters the cavity through the conduit 60 and the port 59 discharging from the port tangentially with respect to the inner wall surface of the cavity 54. After the initial manual ignition of the fuel mixture, the flame becomes self propagating within the cavity 54 adjacent the inlet port 59. The heated gases resulting from the combustion of the fuel mixture expand to envelop and heat the bushing 39 to melt the glass contained therein. Since the combustion cavity 54 is sealed at the top the gases resulting from combustion of the fuel mixture exhaust through the discharge port 53 to envelop the stream of glass 18 thus forming the aforementioned coaxial stream 21 with the molten glass stream 18 as the core.

In operation of the apparatus care is exercised that the exhaust gases from the combustion cavity 54 gently surround the stream of molten glass and thus do not distort its course of travel into the attenuating blast. In some instances, as when an aspirator-type of burner is utilized instead of the conduit 60 for pre-mix, it may be necessary to vent a portion of the exhaust gases out through, for example, ports in the top of the combustion chamber, to assure an enveloping stream of gases for the glass stream of a placid nature.

One form for the cyclonic blast generator 20 is shown in detail in FIGS. 3, 5 and 6 and includes an outer cylindrical wall 62 and an inner wall 63 coaxial therewith. The inner wall 63 is of inverted, cone-shaped configuration having a passage 64 of diminishing cross-sectional area extending from the top to the bottom. An annularly shaped top wall 65, positioned perpendicular to the outer wall 62, joints the top edges of the outer and inner walls. Similarly an annularly shaped bottom wall 66, also disposed perpendicular to the outer wall 62, extends from the bottom of the outer wall 62 to within a short distance of the lower edge of the inner wall 63 thereby providing an opening 67 from the cavity 68. The opening 67 is coaxial with the passage 64 and with the coaxial stream 21. The outer surface of the inner wall 63 is provided with a bevel 69 reducing the thickness of the conical inner wall 63 at the lower edge and the opening 67 in the bottom wall 66 is provided with a conical taper expanding into the cavity 68. The bevel 69 and the tapered opening combine to provide for a smooth flow of gas from the opening 67 in a manner to be described hereinafter. A gas inlet conduit 70 is secured to the outer cylindrical wall 62 of the generator opening into the upper portion of the annular cavity 68 in tangential relation to the outside diameter of the cavity.

The gas under pressure, introduced into the cavity 68 through the pipe 70 follows around the inner surface of the outer wall 62, moves inwardly into contact with the inner wall 63 in a substantially helical pattern and is discharged downwardly through the annular opening 67 between the beveled edge 69 of the inner wall 63 and the periphery of the opening 67 in the bottom wall 66.

The cyclonic blast generator 20 is positioned in glass receiving relation beneath the glass melting bushing 39 which bushing is adapted to produce a stream of molten glass 18 of somewhat smaller diameter than the aperture formed by the minimum diameter of the passage 64 at the lower edge of the inverted cone-shaped inner wall 63. The stream of glass 18 substantially enveloped by the heat retaining combustion gases, gravitate in coaxial relation along the axis of the passage 64 emerging therefrom within the confines of the opening 67 where the whirling gas stream issuing through the opening 67 at high velocity grasps and attenuates the molten stream 21 into a great number of extremely fine staple fibers 22 as indicated by the cone 23 in FIGS. 1 and 2. As diagrammatically illustrated in FIG. 3, the fibers 22 are also curled by the high velocity swirling blast as they are attenuated in the reduced pressure area in the immediate vicinity of the opening 67. Due to their fineness, the fibers 22 quickly cool below the fluent point and retain their curliness or sinuosity to assist in forming a low density mat.

A plurality of combustion chambers 19 and cyclonic blast generators 20 may be used with a central glass melting tank 15 issuing a plurality of streams of molten glass, as shown in FIG. 2. Each stream 18 passes through the openings 45 and 41 respectively penetrating the cover 44 and the base 40 of the bushing 39. The gases burned in the cavity 54 generate additional heat to further decrease the vicosity of the molten glass stream 18 and the exhaust gases envelop the stream of glass in the coaxially formed stream 21 to retain the high temperature of the stream of glass 18 as it enters the passage 64 in the cyclonic blast generator 20.

Figure 7:
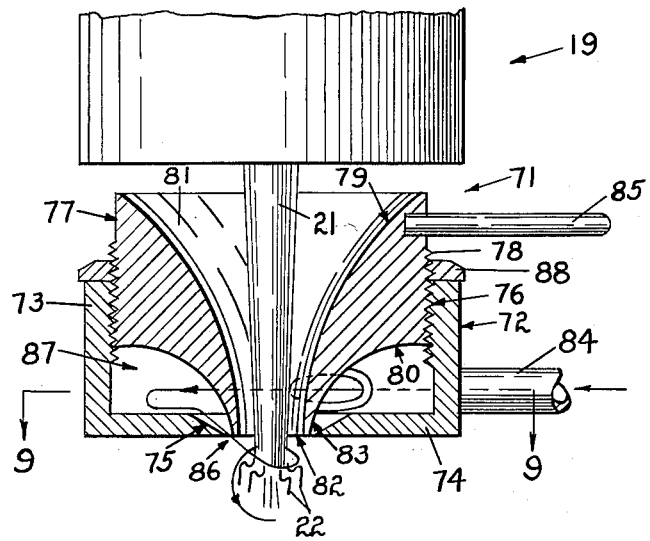
FIG. 7 is an elevation in section taken on the vertical centerline of a second form of the cyclonic blast generator.
Figures 8, 9:
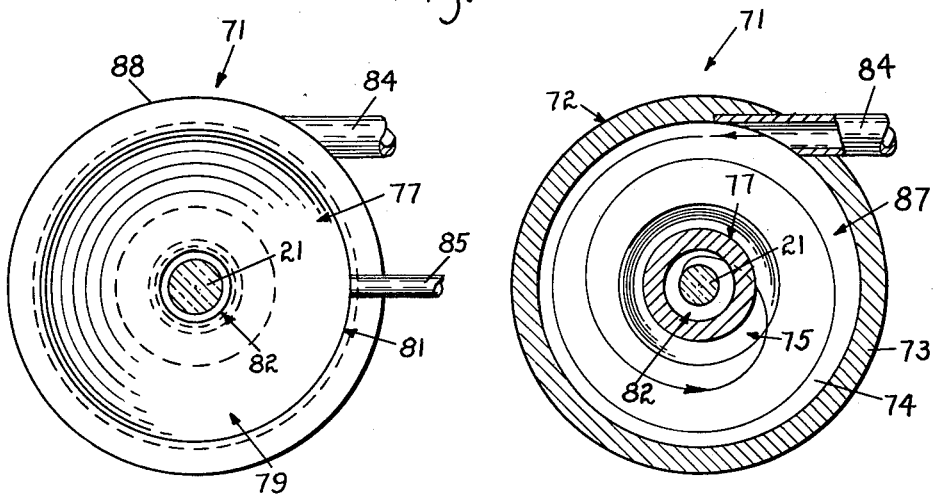
FIG. 8 is a plan view of the cyclonic blast generator of FIG. 7.
FIG. 9 is a cross-sectional view of the cyclonic blast generator of FIG. 7 taken on the line 9—9.

Another embodiment of the cyclonic blast generator is shown in FIGS. 7, 8 and 9 and is generally indicated by the numeral 71. The modified generator is comprised of an outer shell 72 including an upstanding cylindrical wall 73 joined to a bottom wall 74 and positioned perpendicular thereto. The bottom wall 74 is cylindrical in plan and is provided with an upwardly diverging conical opening 75, positioned coaxially of the upstanding wall 73. The upper portion of the inner surface of the upstanding wall 73 is provided with threads 76. An annular core member 77 has a cylindrical outer surface with the lower portion threaded as indicated by the numeral 78 to mate with the threaded inner surface of 76 of the upstanding wall 73. The core member 77 is of nozzle-like structure and in vertical section (FIG. 7), the top and bottom surfaces 79 and 80 respectively are both of cycloid-like configurations which converge downwardly, the former from an enlarged circular inlet orifice 81 approximating the outside diameter of the core member 77 to a restricted circular outlet orifice 82, and the latter from the threaded diameter 78 to a reduced diameter 83 circumscribing the outlet orifice 82, each coaxial to the outer threaded surface 78.

A gas inlet conduit 84 is inserted through the wall 73 of the shell 72 in tangential relation to the internal diameter of the shell and is secured in gas tight relation to the wall 73. A handle 84 is provided to rotate the core member 77 with respect to the stationary shell 72. By threading the core member 77 into the outer cylindrical wall 73, the outlet orifice 82 is positioned into and in coaxial alignment with the conical opening 75 of the bottom wall 74. Thus an annular gas discharge orifice 86 is provided between the periphery of the outlet orifice 82 of the core 77 and the periphery of the conical opening 75 in the bottom wall 74 of the outer shell 72.

An annular gas chamber 87 is bounded by the bottom wall 74 and side wall 73 of the shell 72 and the bottom surface 80 of the core 77. Gas introduced into the gas chamber 87 is set into swirling motion and is discharged as a cyclonic blast through the annular outlet aperture 86. By suitable manipulation of the handle 85 the core can be threaded a desired distance into the outer shell 72. It will be seen that when this is done, the size of the gas discharge aperture 86 is varied and also the angle at which the gas strikes the molten glass stream can be varied. A half nut 88 is employed to lock the core in adjusted position.

Figure 10:
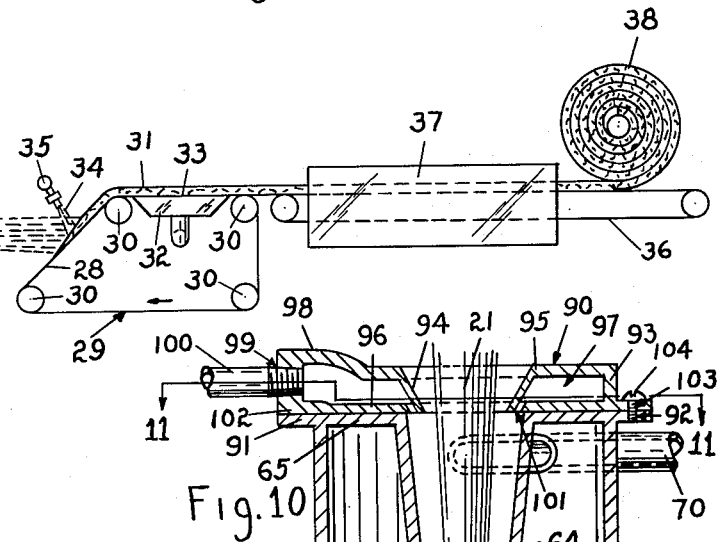
FIG. 10 is a sectional view taken along a vertical plane of a third form of the cyclonic blast generator.
Figure 11:
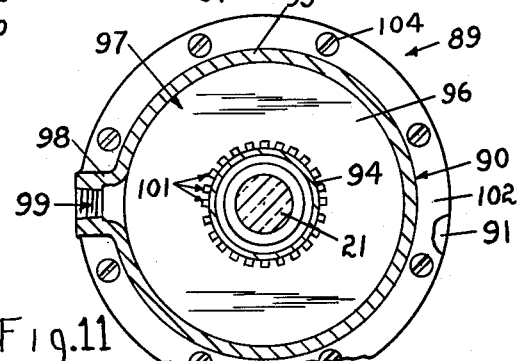
FIG. 11 is a cross-sectional view of the cyclonic blast generator of FIG. 10 taken on the line 11—11.

Another form of the cyclonic blast generator is shown in FIGS. 10 and 11 and is generally indicated by the numeral 89. This form is similar to that of FIG. 3 but is additionally comprised of a manifold 90 adapted to discharge a liquid fuel in enveloping relation to the coaxial stream 21 comprised of molten glass 18 enveloped by the hot combustion gases. The liquid fuel is ignited as it emerges from the passage 64 in the attenuating zone.

In order to mount the manifold 90 on the top wall 65 of the cyclonic blast generator 20, a projecting circumferential flange 91 extends the top wall 65 beyond the diameter of the vertically disposed outer wall 62. The flange is provided with a plurality of threaded holes 92 spaced at equal intervals adjacent the periphery.

The manifold 90 is comprised of a short vertically extending cylindrical outer wall 93 and a conical inner wall 94 converging inwardly from top to bottom with a minor diameter smaller than the major diameter at the upper end of the generator passage 64 and annular top and bottom walls, respectively indicated by the numerals 95 and 96, perpendicular to the outer wall, joining the inner and outer walls to form an annular chamber 97. A boss 98 having a threaded opening 99 receives a conduit 100 which connects the chamber 97 to a pressurized source of a liquid fuel mixture. A plurality of fuel discharge orifices 101 penetrates the lower wall 96 of the manifold 90 in the annular overhang formed at the juncture of the conical inner walls 63 and 94 respectively of the generator 20 and the manifold 90. As shown in FIG. 10 the orifices are inclined at an angle converging upon the coaxial stream 21 so that this stream is completely enveloped in the liquid fuel. Ignition of the fuel either at the fuel discharge orifices or at the attenuation zone at the opening 67 as desired depending upon whether a stoichiometric mix of fuel and air or whether an oxygen poor mix is employed. In either event the burning fuel will be effective to increase the temperature of the glass and thereby reduce its viscosity for increased efficiency of attenuation. In other respects the cyclonic blast generator 89 (FIGS. 10 and 11) functions similarly to the generators 20 and 71 of FIGS. 3 and 7 respectively. A flange 102 extends the lower wall 96 of the manifold 90 to correspond with the diameter of the flange 91 and is provided with a plurality of clearance holes 103 in alignment with the tapped holes 92 to permit passage of screws 104 therethrough into engagement with the tapped holes 92, thus unifying the assembly.

The cyclonic blast generators of the present invention are fabricated from materials which are capable of resisting the temperature and the corrosive nature of the gas employed to attenuate the fibers as well as the temperature of the glass passing through the generator. Generally stainless steel or other similar metals are to be preferred, although when operating at lower temperature, metals such as brass, cold rolled steel and the like may be employed. In some instances it may be desirable to line the passage through which the glass stream flows with platinum to provide additional resistance to the erosive action of the molten glass. Also it is to be included within the scope of the invention to employ cyclonic generator units fabricated of refractory materials such as sillimanite and the like. Additionally a thermally insulating refractory material may be employed in the annular gas chamber of the generator for lining the same and thus aid in the retention of heat in the attenuating gas.

Glass compositions which are adaptable to use in the present invention include those having low softening points and low viscosities in the molten state. Lead, phosphate and low calcium glasses are of the type which may be used.

Compositions within the ranges expressed in the following table are satisfactory:

| Constituent— | Percent by weight |
|---|---|
| $SiO_2$ | 47–60 |
| $B_2O_3$ | 9–15 |
| $Al_2O_3$ | 5–10.5 |
| Alkali metal oxide ($Na_2O$, $K_2O$) | 2–18 |
| Alkaline earth metal oxide (CaO, MgO, BaO, ZnO) | .05–16 |
| $CaF_2$ | 1.0–3 |

More particularly compositions within the ranges expressed in the following table are preferred:

| Constituent— | Percent by weight |
|---|---|
| $SiO_2$ | 47–60 |
| $B_2O_3$ | 9–15 |
| $Al_2O_3$ | 5–10.5 |
| $Na_2O$ | 8–13 |
| $K_2O$ | 2–5 |
| CaO | 1–10 |
| MgO | .05–1 |
| BaO | 2–6 |
| ZnO | 2–6 |
| $CaF_2$ | 1.0–3 |

Still further the following is a specific glass composition adapted to use in the present invention:

| Constituent— | Percent by weight |
|---|---|
| $SiO_2$ | 53.1 |
| $B_2O_3$ | 11.1 |
| $Al_2O_3$ | 5.1 |
| $Na_2O$ | 9.8 |
| $K_2O$ | 3.1 |
| CaO | 6.3 |
| MgO | 0.2 |
| BaO | 4.7 |
| ZnO | 3.5 |
| $CaF_2$ | 3.1 |

Glass compositions as defined above are characterized by low fiber softening points between 1200° F. and 1300° F. and by a low liquidus temperature between 1300° F. and 1500° F. However, the temperature of the molten glass as it passes into the fiberizing zone should be at a minimum of 2200° F. to provide a low viscosity.

Gases adaptable for use in generating the cyclonic blast for attenuating and curling the fibers as recited above include compressed air, super-heated steam, nitrogen, carbon dioxide and other similar gases. Air and steam are preferred because of their relative low cost. In general, it is desirable to operate with the temperature of the attenuating gas above that of the temperature of the molten glass stream as it passes into the fiberizing zone. It has been determined by experimentation that best results are obtained when the temperature of the gas exceeds the temperature of the molten glass stream by about 200° F. However it is to be included within the scope of the invention to use gas at temperatures as low as room temperature.

When air is heated within the preferred range specified above and discharged from the generator at a velocity of approximately 58 cubic feet per minute in the helically descending path described above, a ⅛ inch diameter molten stream of glass of the specified composition will be attenuated into a plurality of curly staple fibers averaging 8 to 13 microns in diameter. Fibers approaching 1 micron in diameter have been produced using a boro-calcite glass composition. The curly fibers deposited on the conveyor chain at a low velocity by the method and apparatus disclosed herein produce a mat of extremely low density, which may be as low as 1/16 pound per cubic foot.

Fibers of glass produced by the present apparatus are different from those produced by flame attenuation as heretofore practiced.

Prior flame attenuated fibers have been of extremely short length, due probably to the fact that the extremely high velocity of the prior blasts, compared with the temperature, "burns off" or severs the attenuated fibers from the primary filaments before the attenuated fibers can attain appreciable length. Thus fibers heretofore produced have, for example, in the one micron diameter range been of a length of only about 1/16 to about 3/16 of an inch. These fibers have also been straight and thus do not adhere tenaciously to each other when in mat form. This is evidenced by the fact that prior mats have displayed low tensile strength and integrity.

The present fibers differ from prior fibers in two respects:

(1) The fibers are long.
(2) They are of curly or sinuous body configuration.

A further characteristic of the fibers produced by the present invention is that they are generally quite free of shot. Shot can be defined as small spheres of glass which are formed by remelting of the ends of the fine fibers after they are attenuated.

While the present method and apparatus have been described with reference to the production of mats of glass fibers having a cured thermosetting synthetic resin bonding agent applied to the fibers, it is to be included within the scope of the invention to produce unbonded fibers. When so operating, the resin spray is cut off. Also, the oven may be shut down to conserve fuel.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. Apparatus for producing fine curled fibers of a heat softenable fiber forming material including a bushing for containing a supply of said material, said bushing having a top opening through which said material is fed, a thermally insulated heat exchange chamber enclosing said bushing, means for introducing a gaseous fuel mixture into said chamber for combustion therein, said bushing having an aperture through which said material flows in a molten state about a vertical axis, a restricted outlet in the base of said heat exchange chamber encompassing the aperture in said bushing for exhausting the products of combustion from said heat exchange chamber in enveloping co-axial and placid relation to the stream of molten material, said bushing having the terminus of said aperture supported above said outlet to provide an unobstructed path for said molten material throughout the extent of said outlet, said top opening being sealed from said heat exchange chamber to isolate products of combustion from the interior of said bushing, a cyclonic blast generator having a nozzle of progressively diminishing cross-sectional area and in spaced concentric relation to said stream of molten material and a generator chamber in encompassing relation wtih said nozzle, said generator chamber having a restricted exit adjacent the terminal end of said nozzle and in concentric relation therewith, conduit means for itroducing a gaseous stream tangentially into said generator chamber, said gaseous stream descending in a helical path within said generator chamber to discharge as a high velocity cyclonic blast from said restricted exit to attenuate said stream of molten material into a multitude of fine curly fibers.

2. Apparatus for producing fine curly glass fibers comprising, in combination: a glass melting bushing having bottom and side walls for containing molten glass, said bottom wall having an aperture through which molten glass is discharged as a stream; an outer enclosure in spaced relation with said bushing and defining therebetween a heating chamber to which heating gases are supplied; an outlet opening in the bottom of said chamber, said bushing having the terminus of said aperture supported above and in axial alignment with said opening to provide an unsupported and unobstructed path for said stream throughout the extent of said opening, said bushing bottom wall defining with said opening a restricted orifice through which said gases are discharged into enveloping relation with said stream; and a cyclonic blast generator in concentric relation with and to attenuate said stream into a plurality of fine curly fibers.

3. The apparatus as described in claim 1, wherein said cyclonic blast generator comprises an outer wall defining a chamber, a nozzle positioned within said chamber and co-axial thereto, said nozzle having an entrance end and an exit end, said chamber having a circular outlet in a plane common with the exit end of said nozzle and concentric thereto to form a restricted annular gas discharge opening for said chamber, means for introducing pressurized gas into said chamber, said gas descending in a path within said chamber to discharge as a high velocity blast from said restricted annular gas discharge opening, and means for introducing a combustible fuel mixture into said entrance end of said nozzle for ignition at the exit end of said nozzle.

References Cited in the file of this patent

UNITED STATES PATENTS

| | | |
|---|---|---|
| 1,856,679 | Williams et al. | May 3, 1932 |
| 2,212,448 | Modigliani | Aug. 20, 1940 |
| 2,227,357 | Martin | Dec. 31, 1940 |
| 2,411,660 | Manning | Nov. 26, 1946 |
| 2,450,363 | Slayter et al. | Sept. 28, 1948 |
| 2,485,807 | Berthold et al. | Oct. 25, 1949 |
| 2,489,243 | Stalego | Nov. 22, 1949 |
| 2,530,345 | Watts | Nov. 14, 1950 |
| 2,557,834 | McMullen | June 19, 1951 |
| 2,559,572 | Stalego | July 3, 1951 |
| 2,563,080 | Stalego | Aug. 7, 1951 |
| 2,571,457 | Ladisch | Oct. 16, 1951 |
| 2,585,496 | Powell | Feb. 12, 1952 |
| 2,626,424 | Hawthorne | Jan. 27, 1953 |
| 2,626,425 | Hawthorne | Jan. 27, 1953 |
| 2,626,484 | Stalego | Jan. 27, 1953 |
| 2,647,851 | Schwartz | Aug. 4, 1953 |
| 2,653,416 | Slayter | Sept. 29, 1953 |
| 2,654,185 | Honiss | Oct. 6, 1953 |
| 2,722,718 | Siu | Nov. 8, 1955 |
| 2,873,197 | McMullen | Feb. 10, 1959 |

FOREIGN PATENTS

| | | |
|---|---|---|
| 461,125 | Canada | Nov. 15, 1949 |
| 247,956 | Switzerland | Mar. 25, 1948 |